United States Patent [19]

Debus et al.

[11] Patent Number: 5,234,968

[45] Date of Patent: Aug. 10, 1993

[54] THICKENING SYSTEM FOR WATER-BASED BUILDING MATERIAL MIXES

[75] Inventors: Gerhard Debus, Assmannshausen; Heinz-Josef Mann, Saulheim; Martin Lüdke, Oestrich-Winkel, all of Fed. Rep. of Germany

[73] Assignee: Hoechst Aktiengesellschaft, Frankfurt am Main, Fed. Rep. of Germany

[21] Appl. No.: 704,463

[22] Filed: May 23, 1991

[30] Foreign Application Priority Data

May 25, 1990 [DE] Fed. Rep. of Germany ....... 4016979

[51] Int. Cl.$^5$ ............................................. C08L 1/26
[52] U.S. Cl. ...................................... 524/42; 524/43; 524/405; 524/503
[58] Field of Search ................... 524/42, 43, 405, 503

[56] References Cited

U.S. PATENT DOCUMENTS

| 3,438,808 | 4/1969 | Hawkins et al. | 524/405 |
| 3,600,342 | 8/1971 | Nickerson et al. | 524/405 |
| 3,720,633 | 3/1973 | Nickerson | 524/405 |
| 4,654,085 | 3/1987 | Schinski | 106/93 |
| 4,820,754 | 4/1989 | Negri et al. | 524/44 |
| 4,846,889 | 7/1989 | Meyer | 106/115 |

*Primary Examiner*—Paul R. Michl
*Assistant Examiner*—John J. Guarriello
*Attorney, Agent, or Firm*—Connolly and Hutz

[57] ABSTRACT

Thickening systems for water-based building material mixes, composed of 0.01 to 2% by weight of a water-soluble cellulose ether, 0.01 to 2% by weight of polyvinyl alcohol and 0.005 to 1% by weight of boric acid or salts thereof, the respective percentages being based on the dry substance content of the building material mix. Due to the addition of boric acid or borax, these thickening systems have an improved thickening action compared with thickening mixtures composed only of cellulose ether and polyvinyl alcohol.

13 Claims, No Drawings

THICKENING SYSTEM FOR WATER-BASED BUILDING MATERIAL MIXES

Cellulose ethers are added to modern building materials, such as plasters, adhesives, knifing fillers etc., in order to improve their working properties. Cellulose ethers give the corresponding products a high water retention capacity, increase their stability under load and improve their adhesion. To improve the stability under load still further, cellulose ethers are frequently modified with synthetic or natural organic polymers. For more than twenty years, publications and patent applications have been describing building material mixes containing not only cellulose ethers but also polyacrylamides (PAA) or PAA-modified cellulose ethers (e.g. DE-AS 1 283 726; DE-AS 1 646 501; DE-OS 2 146 709; U.S. Pat. No. 4 021 257). Apart from the addition of PAA, a further modification variant described in DE-OS 33 39 860 is the chemical coupling of cellulose ethers with polyacrylamides. However, the advantages associated with the modification often have an unfavorable effect on the adhesive properties of the building material mixes.

The present invention relates to thickening systems for water-based building material mixes, composed of 0.01 to 2, preferably 0.1 to 1.0 part by weight of a water-soluble cellulose ether, 0.01 to 2, preferably 0.1 to 1.5 parts by weight of polyvinyl alcohol and 0.005 to 1, preferably 0.05 to 0.5 part by weight of boric acid and/or salts thereof, the respective parts by weight corresponding to the percentages based on the dry substance content of the building material mix.

The invention further relates to building material mixes containing this thickening system. In this case, the parts by weight given are to be regarded as percentages by weight, based on the dry substance content of the building material mix.

The thickening systems described are suitable for all water-based building material mixes, especially tile cements, knifing fillers, plasters or coating materials. Possible tile cements are the conventional products of this type containing, for example, up to about 50% by weight of cement and up to about 10% by weight of conventional additives, as well as sand. Examples of coating materials are size colors, cement paints, dispersion paints, silicone resin paints etc.

Possible water-soluble cellulose ethers for the thickening systems according to the invention are, in particular, methyl cellulose, methyl hydroxyethyl cellulose, methyl hydroxypropyl cellulose, hydroxyethyl cellulose and hydrophobically substituted derivatives thereof, hydroxyethyl hydroxypropyl cellulose and hydrophobically substituted derivatives thereof, carboxymethyl cellulose or carboxymethyl hydroxyethyl cellulose. Hydroxyethyl cellulose ether and methyl hydroxyalkyl cellulose ethers are preferred. In conventional manner, these cellulose ethers can contain small amounts of modifiers.

Apart from these water-soluble cellulose ethers, the thickening systems according to the invention also contain polyvinyl alcohol (PVA) in the amount indicated. Possible polyvinyl alcohols are fully or partially saponified or internally plasticized polyvinyl alcohols with an average degree of polymerization of 150 to 10,000, preferably 300 to 5000. Products containing polyvinyl alcohol as a component, e.g. plastics dispersions and powdered plastics, are also suitable. As a third component, the thickening systems according to the invention also contain boric acid or salts thereof, preferably borax.

The additional increase in thickening action afforded by the cellulose ether present in the thickening system may by based on complexation between PVA and borax to produce a diol complex, where two polyvinyl alcohol chains are coupled together via a borate ion. The greater thickening afforded by the cellulose ethers results in higher consistencies of the building material mixes, which usually improve the stability under load. This will be demonstrated in the following Examples.

Particularly high demands in respect of stability under load are made on thin-bed bonding mortars (cement-based tile adhesives). Another important criterion for thinbed bonding mortars is their adhesive strength. For this application, the thickening system according to the invention has a substantially improved adhesive strength compared with mixtures of cellulose ethers and other polymers.

EXAMPLES

1. Tile adhesives

| Composition of the basic mix (100 parts by weight) | |
| --- | --- |
| Portland cement PZ 45 F | 40 parts by weight |
| Quartz sand 0.01 mm–0.5 mm | 58 parts by weight |
| Powder for plastics dispersions (copolymer of vinyl acetate and vinyl versatate) | 2 parts by weight |

The composition of the tile adhesive is shown in the following Table. Example 1 is a Comparative Example.

| | Example | | |
| --- | --- | --- | --- |
| | 1 | 2 | 3 |
| | Parts by weight | | |
| Basic mix | 98 | 98 | 98 |
| Borax | — | 0.2 | 0.3 |
| Methyl hydroxyethyl cellulose (unmodified) | 0.5 | 0.5 | 0.5 |
| | $\mu$mol/kg | | |
| Polyvinyl alcohol | — | 77 | 35 |
| Water factor | 0.24 | 0.25 | 0.26 |

The amount of PVA is based on 1 kg of dry substance. The water factor is governed by the apparent water requirement; in other words, water was used in the amount which gave a consistency suitable for working.

Evaluation criteria a) Slippage behavior: The adhesive was applied to a concrete paving slab with a 6×6 mm toothed spatula, an approx. 600 g stoneware tile (edge length: 15 cm) was immediately laid on the top edge of the slab and a 5 kg weight was placed on the tile for 30 seconds. The slab is then placed in the vertical position and the tile is observed for slippage over a period of 10 minutes. Any slippage is measured in mm from a mark made with a spatula at the top edge of the tile during application of the load.

b) Adhesive strength according to DIN 18156, part 2, 1978 edition, 28 days of normal storage with earthenware and stoneware tiles.

Results

| | Example | | |
|---|---|---|---|
| | 1 | 2 | 3 |
| Slippage [mm] | slipped | 0–1 | 0–1 |
| Adhesive strength [N/mm$^2$] | | | |
| Earthenware | 1.3 | 1.0 | 1.1 |
| Stoneware | 1.0 | 1.2 | 1.3 |

Example 1, with unmodified methyl hydroxyethyl cellulose, gives good adhesive strengths, as expected, but is a formulation of no practical use because of the poor slippage behavior. Examples 2 and 3, containing the thickening components according to the invention, satisfy the slippage test and show good adhesive strengths.

2. Plaster-based knifing fillers

The composition of the knifing filler is shown in the following Table. Example 4 is a Comparative Example.

| | Example | | | |
|---|---|---|---|---|
| | 4 | 5 | 6 | 7 |
| | Parts by weight | | | |
| Plaster of Paris (β-hemihydrate) | 99 | 98.1 | 97.7 | 96.8 |
| Methyl cellulose (unmodified) | 1.0 | 1.0 | 1.0 | 1.0 |
| Borax | — | 0.3 | 0.5 | 0.7 |
| Polyvinyl alcohol | — | 0.6 | 0.8 | 1.5 |
| Water factor | 0.55 | 0.55 | 0.55 | 0.55 |

Results

| | Example | | | |
|---|---|---|---|---|
| | 4 | 5 | 6 | 7 |
| Thickening | 0 | +1 | +2 | +3 |

Addition of the thickening system according to the invention (Examples 5, 6 and 7) increases the consistency (greater thickening) for the same water factor of 0.55.

The thickening action was evaluated according to the following scale of values: 0=initial thickening; +1=somewhat greater thickening; +2=substantially greater thickening; +3=very substantial thickening.

What is claimed is:

1. A thickening system for water-based building material mixes, comprised of 0.01 to 2 parts by weight of a water-soluble cellulose ether, 0.01 to 2 parts by weight of polyvinyl alcohol and 0.005 to 1 part by weight of boric acid and/or salts thereof.

2. A thickening system as claimed in claim 1 comprised of 0.1 to 1.0 part by weight of a water-soluble cellulose ether, 0.1 to 1.5 parts by weight of polyvinyl alcohol and 0.05 to 0.5 part by weight of boric acid and/or salts thereof.

3. A thickening system as claimed in claim 1 containing hydroxyethyl cellulose ether or methyl hydroxyalkyl cellulose ethers as water-soluble cellulose ethers.

4. A thickening system as claimed in claim 1 containing borax.

5. A building material mix containing a thickening system comprised of 0.01 to 2% by weight of a water-soluble cellulose ether, 0.01 to 2% by weight of polyvinyl alcohol and 0.005 to 1% by weight of boric acid and/or salts thereof, the respective percentages being based on the dry substance content of the building material mix.

6. A method for the preparation of water-based building material mixes, comprising the application of a thickening system according to claim 1.

7. A method as claimed in claim 6, wherein the water-based building material mixes are selected from the group consisting of tile cements, knifing fillers, plasters and coating materials.

8. A building material mix as claimed in claim 5 wherein the water-soluble cellulose ether is hydroxyethyl cellulose ether or a methyl hydroxyalkyl cellulose ether.

9. A building material mix as claimed in claim 5, wherein the salt of boric acid is borax.

10. A building material mix as claimed in claim 5, comprising
   a basic mix which is a tile cement or tile adhesive, a knifing filler, a plaster, or a coating material and said thickening system.

11. A building material mix as claimed in claim 10, wherein the basic mix comprises a cement, optionally mixed with sand, or plaster of paris.

12. A building material mix as claimed in claim 10, wherein the water-soluble cellulose ether is hydroxyethyl cellulose ether or a methyl hydroxyalkyl cellulose ether, and the boric acid salt is borax.

13. A method of applying a water-based building material comprising the steps of adding an effective amount of water to the composition of claim 5 until a consistency suitable for working is obtained, and then applying the resulting water-based building material mixture to a surface.

* * * * *